(12) United States Patent
Correa et al.

(10) Patent No.: US 7,773,161 B2
(45) Date of Patent: Aug. 10, 2010

(54) METHOD AND APPARATUS FOR CONTROLLING A DISPLAY DEVICE

(75) Inventors: Carlos Correa, Villingen-Schwenningen (DE); Sébastien Weitbruch, Mönchweiler (DE); Didier Doyen, La Bouexière (FR); Jonathan Kervec, Geveze (FR)

(73) Assignee: Thomson Licensing, Boulogne-Billancourt (FR)

( * ) Notice: Subject to any disclaimer, the term of this patent is extended or adjusted under 35 U.S.C. 154(b) by 1052 days.

(21) Appl. No.: 10/433,169

(22) PCT Filed: Nov. 19, 2001

(86) PCT No.: PCT/EP01/13346

§ 371 (c)(1),
(2), (4) Date: May 30, 2003

(87) PCT Pub. No.: WO02/45062

PCT Pub. Date: Jun. 6, 2002

(65) Prior Publication Data

US 2004/0032533 A1    Feb. 19, 2004

(30) Foreign Application Priority Data

Nov. 30, 2000    (EP) ................................. 00403366

(51) Int. Cl.
*G09G 3/28* (2006.01)
*H04N 5/66* (2006.01)
(52) U.S. Cl. ........................................ 348/797; 345/63
(58) Field of Classification Search ............. 345/60–72; 313/581–585; 315/169.4; 348/797
See application file for complete search history.

(56) References Cited

U.S. PATENT DOCUMENTS

| 6,144,364 | A | 11/2000 | Otobe et al. |
| 6,222,512 | B1 * | 4/2001 | Tajima et al. .................. 345/63 |
| 6,292,159 | B1 | 9/2001 | Someya et al. |

(Continued)

FOREIGN PATENT DOCUMENTS

EP    0834856 A1    4/1998

(Continued)

*Primary Examiner*—Jimmy H Nguyen
(74) *Attorney, Agent, or Firm*—Robert D. Shedd; Harvey D. Fried; Sammy S. Henig (57) ABSTRACT

The invention deals with the large area flicker effect reduction in display devices like plasma display panels, in which the light output is controlled by small pulses over a whole frame period and the amount of small pulses determine the brightness of the light output. The invention proposes an adaptation of the known principle of sub-field grouping for large area flicker reduction for the specific sub-field coding process called incremental sub-field coding, in which only those sub-field code words are taken for display driving having the characteristic that there is never a sub-field inactivated between two activated sub-fields or never a sub-field is activated between two inactivated sub-fields.

For this specific sub-field coding it is proposed to make the sub-field grouping in a simple manner, where all the odd sub-fields are grouped together in one group (G1) and all the even sub-fields are grouped together in a second group (G2). Despite the fact that some luminance differences are present in the groups it has been proved, that this sub-field grouping leads to a very efficient large area flicker reduction because of its complementary behaviour to the required dithering technique.

14 Claims, 8 Drawing Sheets

U.S. PATENT DOCUMENTS 6,636,188 B1 * 10/2003 Kanazawa et al. ............ 345/60
6,831,618 B1    12/2004 Suzuki et al.

FOREIGN PATENT DOCUMENTS

| EP | 0 952 569 A2 * | 10/1999 |
| EP | 0 982 708 A1 * | 3/2000 |
| EP | 1124216 A2 | 8/2001 |
| JP | 1185100 A | 7/1989 |
| JP | 9198006 A | 7/1997 |
| JP | 10031455 A | 2/1998 |
| JP | 10307561 A | 11/1998 |
| JP | 11109916 A | 4/1999 |
| JP | 11344953 A | 12/1999 |
| JP | 2000003153 A | 1/2000 |
| JP | 2000137461 A | 5/2000 |

* cited by examiner

(Prior Art)

Fig. 13

(Prior Art)

Fig. 6

(Prior Art)

Fig. 7

(Prior Art)

Fig. 8

(Prior Art)

Fig. 9

(Prior Art)

Fig. 10

(Prior Art)

(Prior Art)

METHOD AND APPARATUS FOR CONTROLLING A DISPLAY DEVICE

This application claims the benefit under 35 U. International Application PCT/EP01/13346 filed 2001, which claims the benefit of European Appl 00403366.8, filed Nov. 30, 2000.

The invention relates to a method and apparatus controlling a display device, such as matrix displays like plasma display panels (PDP), display devices with digital micro mirror arrays, (DMD) and all kinds of displays based on the principle of duty cycle modulation (pulse width modulation) of light emission.

More specifically the invention is closely related to a kind of video processing for improving the picture quality and to an improved controlling of the display drivers, in particular for large area flicker effect reduction.

BACKGROUND

The plasma display technology now makes it possible to achieve flat color panels of large size and with limited depth without any viewing angle constraints. The size of the displays may be much larger than the classical CPT picture tubes would have ever been allowed.

A plasma display panel utilizes a matrix array of discharge cells, which could only be "on" or "off". Also unlike a CRT or LCD in which gray levels are expressed by analog control of the light emission, a PDP controls the gray levels by modulating the number of light pulses per frame (sustain pulses). The eye will integrate this time-modulation over a period corresponding to the eye time response.

Since the video amplitude determines the number of light pulses, occurring at a given frequency, more amplitude means more eye pulses and thus more "on" time. For this reason this kind of modulation is known as PWM, pulse width modulation. To establish a concept for this PWM, each frame will be decomposed in sub-periods called "sub-fields". For producing the small light pulses, an electrical discharge will appear in a gas filled cell, called plasma and the produced UV radiation will excite a colored phosphor, which emits the light.

In order to select which cell should be lighted, a first selected operation called "addressing" will create a charge in the cell to be lighted. Each plasma cell can be considered as a capacitor, which keeps the charge for a long time. Afterwards, a general operation called "sustaining" applied during the lighting period will accelerate the charges in the cell, produce further charges and excite some of the charges in the cell. Only in the cells addressed during the first selected operation, this excitation of charges takes place and UV radiation is generated when the excited charges go back to their neutral state. The UV radiation excites the phosphorous for light emission. The discharge of the cell is made in a very short period and some of the charges in the cell remain. With the next sustain pulse, this charge is utilized again for the generation of UV radiation and the next light pulse will be produced. During the whole sustain period of each specific sub-field, the cell will be lighted in small pulses. At the end, an erase operation will remove all the charges to prepare a new cycle.

In static pictures, this time-modulation, repeats itself, with the base frequency equal to the frame frequency of the displayed video norm. As known from the CRT-technology, all light emission with base frequency of 50 Hz, introduces large area flicker, which can be eliminated by field repetition in 100 Hz CRT TV receivers. Contrarily to the CRTs, where the duty cycle of light emission is very short, the duty cycle of light emission in PDPs is around 50% for middle gray. Also, plasma display panels are operated in 50 Hz or 60 Hz progressive scan mode, i.e. a full frame is displayed in a 20 ms raster. Both of these reduces the amplitude of the 50 Hz or 60 Hz frequency component in the spectrum, and thus large area flicker artifact, but due to the larger size of PDPs, with a larger viewing angle, even a reduced large area flicker becomes objectionable in terms of picture quality. And this is also true for 60 Hz video norms. The present trend of increasing size and brightness of PDPs, will also contribute to aggravate this problem in the future.

A previous European patent application of the applicant addresses this problematic. Reference is made to EP document EP 0 982 708 A1. In this patent application it is proposed a grouping of the sub-fields in a frame period in two consecutive groups and a specific type of sub-field coding, which makes a distribution of the active sub-field periods equally over the two sub-field groups. With this solution practically a doubling of the frame repetition rate is accomplished. The 50 Hz or 60 Hz frequency component is substantially reduced and the image quality is improved. With the use of a sub-field organization where in both groups the most significant sub-field weights are identical the symmetrical distribution of light pulses over the two sub-field groups was relatively easy to achieve. Only small differences in luminance values respectively light pulse numbers needed to be tolerated. But such small differences did not introduce significant large area flicker.

Meanwhile, a new type of sub-field coding has been developed, which is called "incremental sub-field coding". In this type of sub-field coding, there are only some basic sub-field code words used for the gray scale portrayal rendition. This means, that in the case of 8 Bit video data, there are not 256 different sub-field code words for the possible video levels, but instead only a few characteristic sub-field code words for some distinct video levels and the remaining video levels are rendered by some optimized dithering or error diffusion techniques. The specialty of the incremental code is that in each case there is never one sub-field inactivated between two consecutive activated sub-fields and vice versa. With this characteristic the incremental code has the advantage, that the false contour effect is no longer a problem due to the fact that sub-field code words for similar video levels cannot deviate at various bit positions. The structure of such sub-field code words is nearly identical, except for only one sub-field entry. In order to achieve a compensation for the gamma pre-corrected input video signal, it is advantageous for this incremental code, that the sub-fields weights follow a specific behavior, in particular it should follow a gamma function. This means, that the sub-field weights of the sub-fields in a sub-field organization for a frame period increase step-by-step. As a result, there are no sub-fields in the sub-field organization, which have identical sub-field weight. The incremental coding method is disclosed for example in the European patent application EP-A-0 952 569.

With such an incremental code, it is not so easy, to apply the above-explained concept of sub-field grouping and symmetrically distributing the activated sub-field periods over both groups for large area flicker reduction.

INVENTION

It is an object of the present invention to disclose a method and an apparatus, which improves the large area flicker reduction principle for the case that in the PDP the incremental code is used for sub-field coding. This object is achieved by the solution claimed in independent claims 1 and 11. According to the solution claimed in claim 1, an improved large area flicker reduction for the case of using an incremental coding principle, by means of the specific grouping of sub-fields in two consecutive groups, wherein the odd sub-fields are grouped in one group and the even sub-fields are grouped in the other group. This grouping of sub-fields assures that in the case that the next sub-field code word is switched on due to dithering, the additional sub-field weight will be added to the group, which previously had the lower sub-field weight sum, anyhow. Thus, a relatively optimized equalization of the sub-field weights in both groups is accomplished. The large area flicker artifact on PDPs, when displaying 50 Hz based video signals or 60 Hz video signals, etc. is effectively eliminated.

Virtually no extra costs are added for this solution, except the adding of one single erasing/resetting operation between the two sub-field groups and optionally a priming and erasing operation at the beginning of the second group.

Due to the fact that both 100 Hz sub-field groups in the frame period originate from a single picture, the well known 100 Hz TV mode artifact which introduces a "judder" in the video sequence, is also a problem here. This problem can be solved by compensating one of the two 100 Hz, 120 Hz, 150 Hz, etc. fields in the motion direction. This can be done with sub-field entry shifting which is adapted to the doubling of the frame/field rate. The sub-field entry shifting is disclosed in EP-A-0 980 059.

Advantageously, additional embodiments of the inventive method are disclosed in the respective dependent patent claims.

With the measure of exchanging the sub-field group position within a frame period in a predetermined frame period raster or in a randomized fashion, the remaining level of flickering can be further reduced.

DRAWINGS

Exemplary embodiments of the invention are illustrated in the drawings and explained in more detail in the following description.

In the figures.

EXEMPLARY EMBODIMENTS

Figure 1:
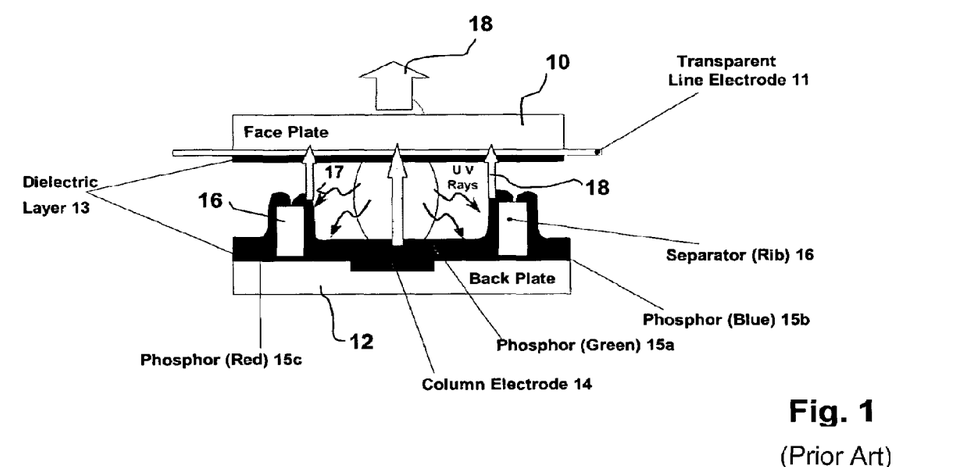
FIG. 1 shows the cell structure of the plasma display panel in the matrix technology.

The principle structure of a plasma cell in the so-called matrix plasma display technology is shown in FIG. 1. Reference number 10 denotes a face plate made of glass. With reference number 11 a transparent line electrode is denoted. The back plate of the panel is referenced with reference number 12. There are two dielectric layers 13 for isolating face and back plate against each other. In the back plate are integrated color electrodes 14 being perpendicular to the line electrodes 11. The inner part of the cells consists of a luminous substance 15 (phosphorous) and separators 16 for separating the different colored phosphorous substances (green 15A) (blue 15B) (red 15C). The UV radiation caused by the discharge is denoted with reference number 17. The light emitted from the green phosphorous 15A is indicated with an arrow having the reference number 18. From this structure of a PDP cell it is clear, that there are three plasma cells necessary, corresponding to the three color components RGB to produce the color of a picture element (pixel) of the displayed picture.

The gray level of each R, G, B component of a pixel is controlled in a PDP by modulating the number of light pulses per frame period. The eye will integrate this time modulation over a period corresponding to the human eye response. The most efficient addressing scheme should be to address n times if the number of video levels to be created is equal to n. In case of the commonly used 8 Bit representation of the video levels, a plasma cell should be addressed 256 times according to this. But this is not technically possible since each addressing operation requires a lot of time (around 2 us per line>960 us for one addressing period>245 ms) for all 256 addressing operations, which is more than the 20 ms available time period for 50 Hz video frames.

Figure 2:
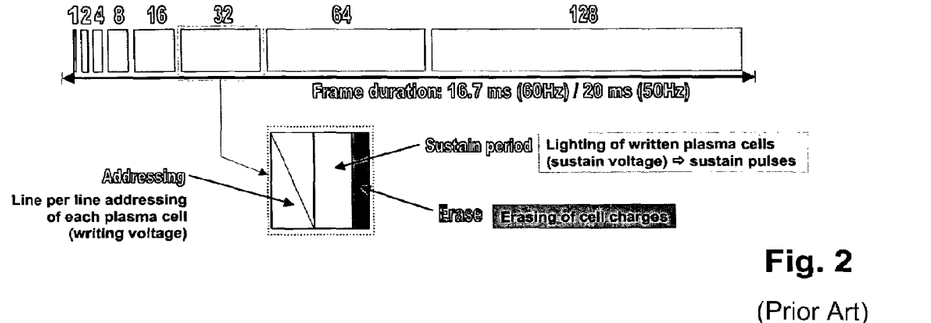
FIG. 2 shows the conventional ADS addressing scheme during a frame period.

From the literature a different addressing scheme is known which is more practical. According to this addressing scheme a minimum of 8 sub-fields (in case of an 8 Bit video level data word) are used in a sub-field organization for a frame period. With a combination of these 8 sub-fields it is possible to generate the 256 different video levels. This addressing scheme is illustrated in FIG. 2. In this figure each video level for each color component will be represented by a combination of 8 bits with the following weights:

1/2/4/8/16/32/64/128

To realize such a coding with the PDP technology, the frame period will be divided in 8 lighting periods (called sub-fields), each one corresponding to a bit in a corresponding sub-field code word. The number of light pulses for the bit "2" is the double as for the bit "1" and so forth. With these 8 sub-periods it is possible, through sub-field combination, to build the 256 gray levels. The standard principle to generate this gray level modulation is based on the ADS (Address/Display Separated) principle, in which all operations are performed are at different times on the whole panel. At the bottom of FIG. 2 it is shown that in this addressing scheme each sub-field consists of three parts, namely an addressing period, a sustaining period and an erasing period.

In the ADS addressing scheme all the basic cycles follow one after the other. At first, all cells of the panel will be written (addressed) in one period, afterwards all cells will be lighted (sustained) and at the end all cells will be erased together.

The sub-field organization shown in FIG. 2 is only a simple example and there are very different sub-field organizations known from the literature with e.g. more sub-fields and different sub-field weights. Often, more sub-fields are used to reduce moving artifacts and "priming" could be used on more sub-fields to increase the response fidelity. Priming is a separate optional period, where the cells are charged and erased. This charge can lead to a small discharge, i.e. can create background light, which is in principle unwanted. After the priming period an erase period follows for immediately quenching the charge. This is required for the following sub-field periods, where the cells need to be addressed again. So priming is a period, which facilitates the following addressing periods, i.e. it improves the efficiency of the writing stage by regularly exciting all cells simultaneously.

Figure 3:
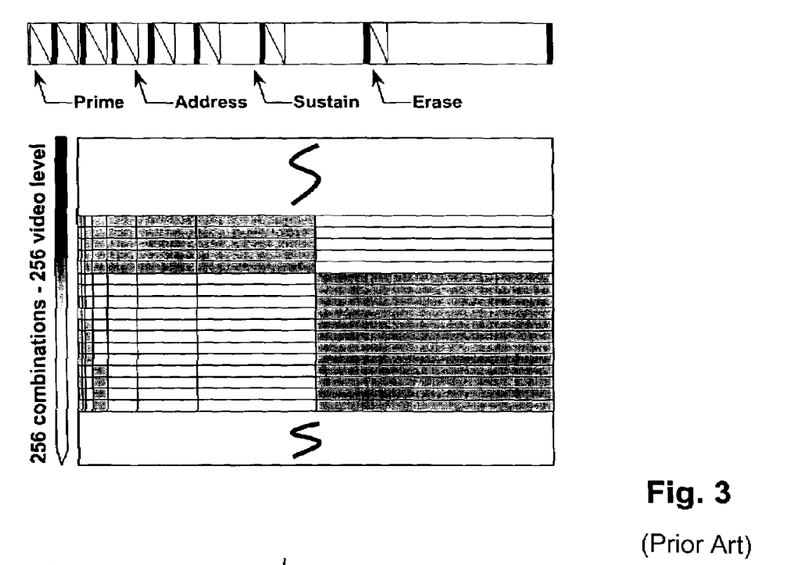
FIG. 3 shows the standard sub-field encoding principle.

The addressing period length is equal for all sub-fields, also the erasing period lengths. In the addressing period, the cells are addressed line-wise from line 1 to line n of the display. In the erasing period all the cells will be discharged in parallel in one shot, which does not take as much time as for addressing. The example in FIG. 3, shows that all operations addressing, sustaining and erasing are completely separated in time. At one point in time there is one of these operations active for the whole panel.

FIG. 3 illustrates the encoding of 256 video levels using the sub-field organizations shown in FIG. 2, inclusive a priming/erase operation at the beginning of a frame period. The eye of the observer will integrate, over the duration of the image period, the various combinations of luminous emissions and by this recreate the various shades in the gray levels.

Figure 4:
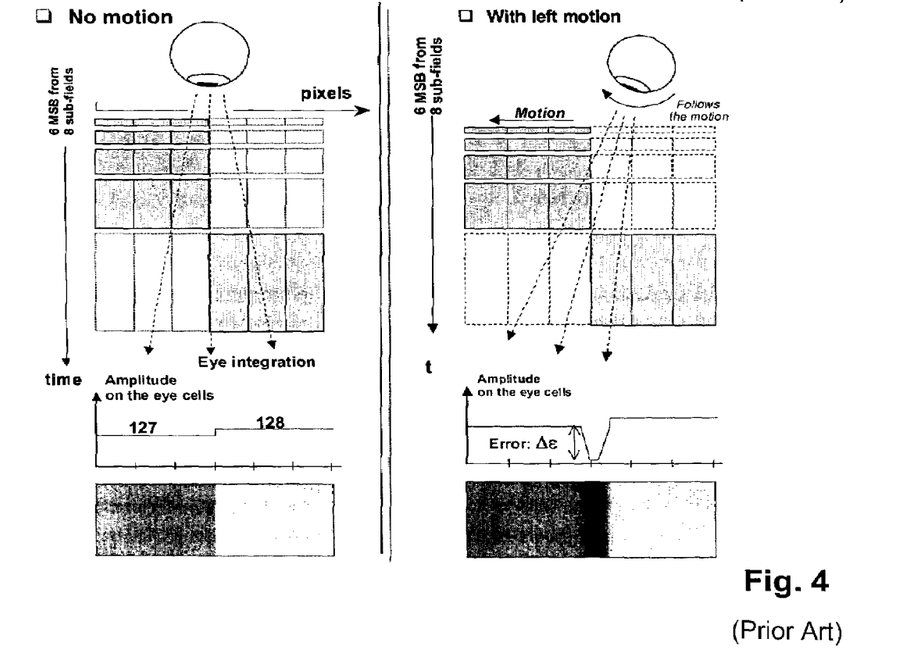
FIG. 4 shows the problematic of false contour effect in case of a standard sub-field encoding.

This integration process is depicted in FIG. 4. The case where no motion is present in the video picture is shown in the left part of FIG. 4. The entries in the 6 most significant Bits of the sub-field code words are shown for 6 pixels. With dark gray it is indicated that the corresponding pixel is activated for light emission in the corresponding sub-field period. The outer left 3 pixels have a video level of 127 and the outer right 3 pixels have a video level of 128. The eye will integrate the light pulses coming from the different sub-field periods. In case of no motion in the picture the eye will correctly integrate all the light pulses for one pixel and catch the correct impression of the video level. This is shown at the bottom of FIG. 4.

In the right part of FIG. 4 it is presumed that there is motion present in the video picture. The video content is the same as in the left part of FIG. 4. In this case the observer will follow the moving object in the successive frames. On a PDP, the light emission time extends over the whole image period. With an assumed movement of 3 pixels per video frame, the eye will integrate light pulses produced in sub-fields coming from 3 neighboring pixels. And this can lead to a false contour effect in case there is a transition in these three different pixels. This effect is well known in the literature and fully described in a number of different patent applications. In the right part of FIG. 4 it is evident, that the eye will catch different light intensity impression, when integrating the light pulses along the 3 indicated different directions. A dark edge will be perceived when observing the moving transition as is illustrated at the bottom of FIG. 4.

Figure 5:
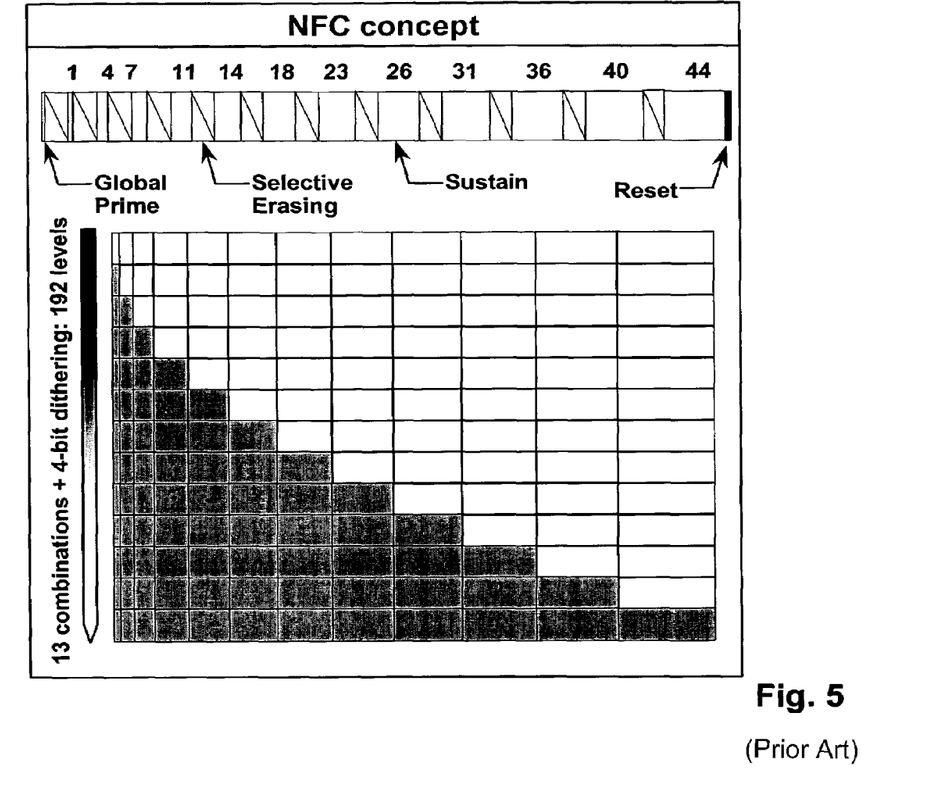
FIG. 5 shows the sub-field encoding principle using an incremental code.

As the false contour effect is as severe problem a number of different solutions for false contour compensation have been developed and are known from the literature. The problem can be solved by a specific type of sub-field encoding, which will be explained, next. According to this solution only a limited number of video levels is rendered for all 256 possible video levels in order to never introduce any temporal disturbances. This code is called "incremental code" because two successive code words differ from each other only by a single Bit entry. Thus, the next code word can be derived directly from the previous code word by adding a further Bit entry to the previous code word. This encoding concept is depicted in FIG. 5. There, at the bottom the different admissible sub-field code words are shown for a sub-field organization with 12 sub-fields as depicted at the top of FIG. 5. The corresponding numbers in FIG. 5 indicate the corresponding sub-field weights. This incremental sub-field coding obviously delimits the number of video levels to the number of sub-fields in the sub-field organization. Concretely, instead of 256 different code words only 13 different code words are admissible. This is negative in the sense of gray scale portrayal. However, with some optimized dithering this problematic can be solved. Also some kind of optimized error diffusion techniques can help to compensate this lack of accuracy.

However, with such a code there will never be one sub-field "off" between two consecutive sub-fields "on" and also there will never be one sub-field "on" between two consecutive sub-fields "off". This is the main advantage of such an incremental coding method, because it suppresses any false contour effect since there are no more any discontinuities between two similar levels (e.g. 127/128) as it was the case with the standard sub-field encoding mode. As previously mentioned, this kind of sub-field encoding requires dithering techniques to dispose of enough video levels and this can introduce some slight noise.

Dithering is a known technique for avoiding to loose amplitude resolution Bits due to truncation. This technique only works if the required Bit resolution is available before the truncation step. Dithering can in principle bring back as many Bits as those lost by truncation. However, dithering can introduce some slight noise in the picture and the more dithering Bits are used the more the noise frequency decreases and, therefore, becomes more noticeable. Specific improvements in the dithering technique for application in PDPs are described in another European patent application of the applicant with the application number 00250099.9. For the disclosure of the present invention it is therefore expressively referred to this patent application, too.

In the following an example is described where a 4 Bit dithering technique is used to increase the number of video levels when a 12 sub-field organization is used as shown in FIG. 5. However, it is strongly noted, that this is only a specific example for explaining the invention and obviously different kind of sub-field organizations with a different number of sub-fields and with different weights of sub-fields can also be used. When using a 4 Bit dithering technique the input video level range should be adapted to the input range from 0-192. This is because with a 4 Bit dithering technique, numbers in the range [0;15] are added to the input video levels and this means that the range is increased to the range [0;207]. Dividing the video levels in this range by 16, i.e. truncation of the 4 least significant Bits, leads to an output video level range [0;12] and this range corresponds to the 13 possible basic sub-field code words shown in FIG. 5. The 192 video levels are obtained via a dithering based on 4 Bits using a spatio-temporal variation of the 13 available basic levels.

Figure 6:
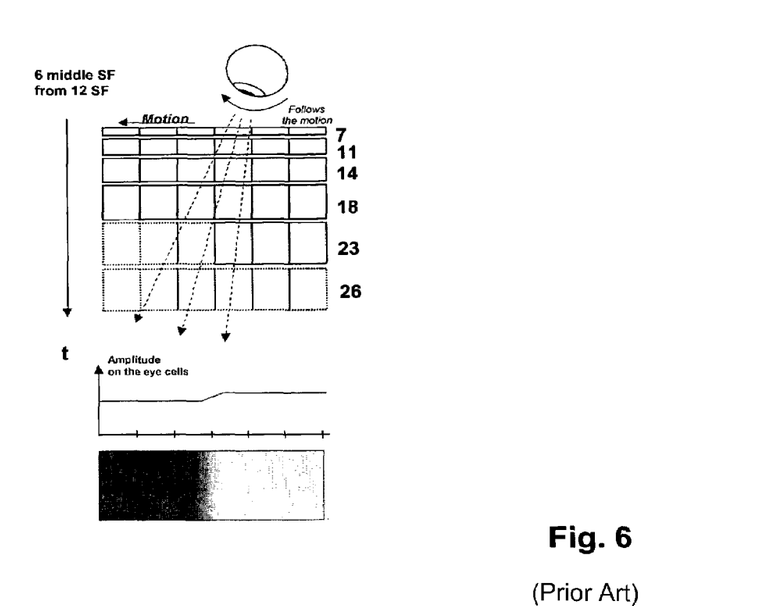
FIG. 6 shows the effect of observing a moving transition in case of incremental sub-field coding.

FIG. 6 illustrates the eye integration behavior in case of a moving transition with video levels 127/128 when these video levels are rendered via the incremental coding and the 4 Bit dithering technique. Only 6 sub-fields are shown in this example. The numbers at the right side of FIG. 6 denote the corresponding sub-field weights. Of course, in the single picture there is not the same video level representation as the input video levels 127/128, however, this with the spatio/temporal variation of the video levels the eye will catch the right impression on average. From FIG. 6 it is evident that the moving transitions between similar video levels are no more a source of false contouring but leads to a smooth transition. This is shown at the bottom of FIG. 6.

Figure 7:
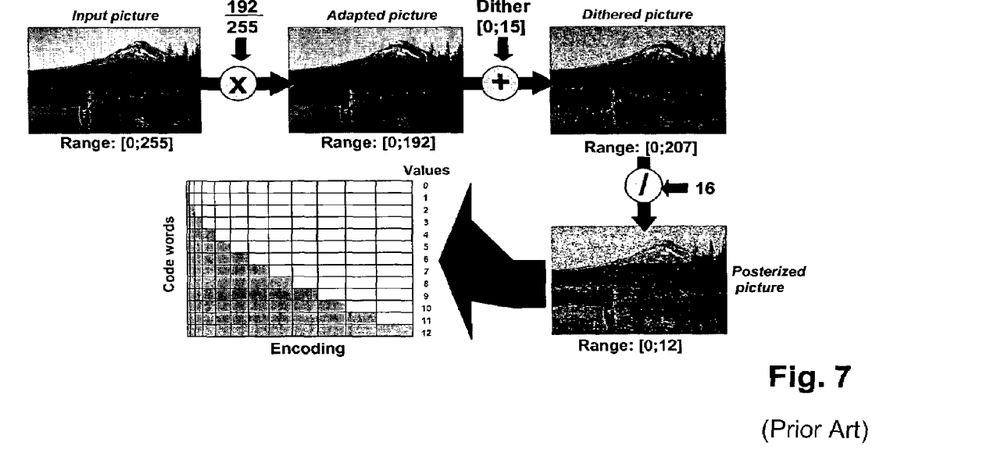
FIG. 7 shows the video processing steps for preparation of the incremental sub-field encoding.

FIG. 7 shows the different steps when applying this technique. The input video picture in the video level range [0;255] is normalized in a first step to intermediate video level range

[0;192]. To the thus adapted picture the dithering numbers in the range [0;15] are added. A dithered picture in the range [0;207] is resulting. In the following step the number of 16 divides the video levels of the dithered picture. This corresponds to truncation of the 4 least significant Bits. What remains are 4 Bit words for the video levels in the posterized picture. The 4 Bit words, however, are restricted to the range [0;12]. And this is what is needed for the sub-field encoding process with the incremental code. To those 4 Bit words corresponding 12 Bit sub-field code words are assigned, finally. Of course, in the posterized picture a lot of details have been lost. But due to the spatio/temporal variation of the video content, some details will be restored on average. On the other hand, here only a sub-field organization of 12 sub-fields is used. A better way is to use more sub-fields, and the more sub-fields used, the less details are lost.

Figure 8:
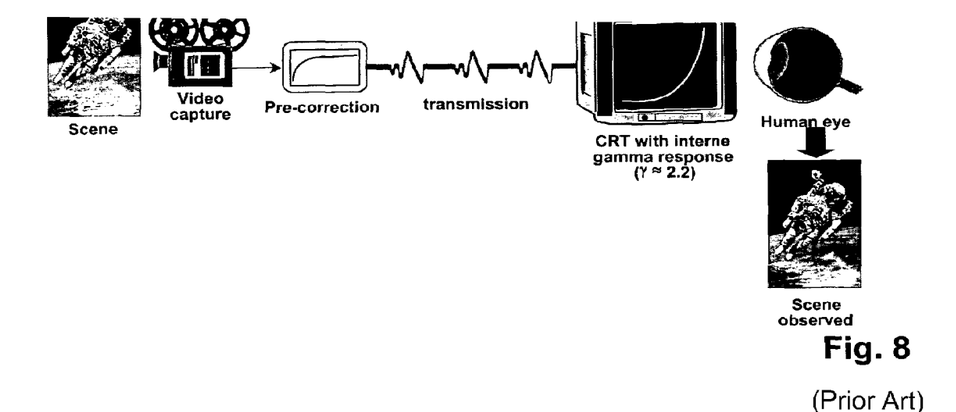
FIG. 8 shows the principle of the gamma pre-correction for standard CRT displays.

The second important idea behind the concept of incremental sub-field coding is the implementation of the gamma correction function by corresponding adaptation of the sub-field weights in a sub-field organization. First, the problematic behind this is explained. The CRT displays do not have a linear response to the beam intensity but rather they have a quadratic response. This is well known in the art and for that reason, the picture sent to the displays is pre-corrected in the studio or mostly in the camera itself so that the picture seen by the human eye respects the filmed picture. This principle is illustrated in FIG. 8. The camera performs an inverse gamma correction to the pictures. These pre-corrected pictures are broadcasted and in the TV receivers the pictures are automatically displayed with the right linear response because of the gamma function-like response characteristic of the picture tubes. The human eye will observe the correct color impressions.

Figure 9:
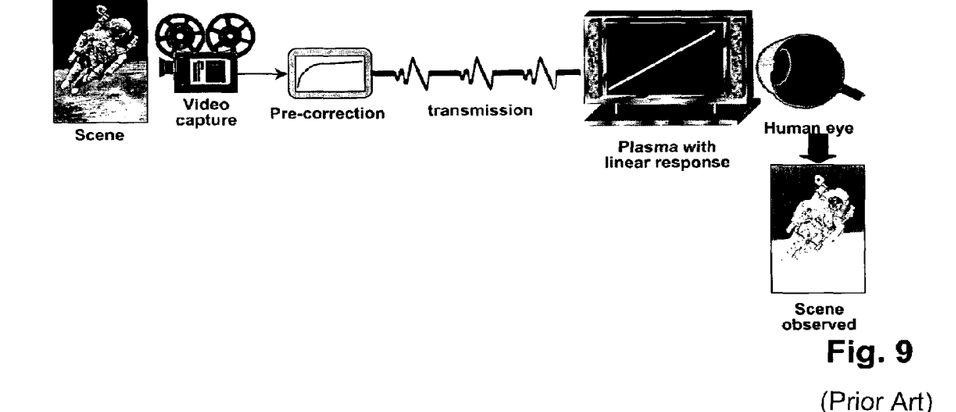
FIG. 9 shows the result of displaying a standard pre-corrected picture on a PDP, having a linear display characteristic.

The plasma display panels have a fully linear response characteristic. Therefore, the pre-correction made at the source level will degrade the observed picture which becomes unnatural as is illustrated in FIG. 9.

Figure 10:
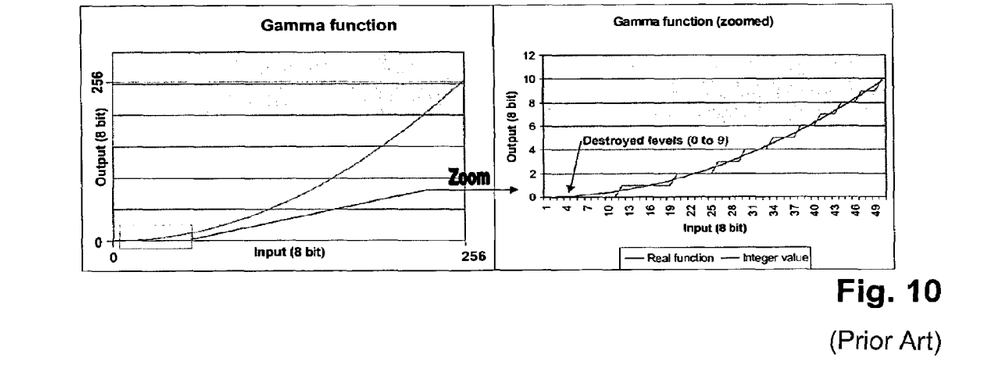
FIG. 10 shows the affection of low video levels in case of standard sub-field encoding due to the need of gamma pre-correction compensation.

Therefore, an artificial degamma needs to be implemented in the signal processing of a PDP. When a standard sub-field encoding method is used, the gamma correction is made in the plasma display unit directly before the sub-field encoding process. This can introduce some problems, mostly in the lower video levels as it is illustrated in FIG. 10. On the left part of FIG. 10 a standard gamma function is depicted. On the abscissa, the input video level is listed. On the ordinate, the output video level is listed. The depicted gamma function can be illustrated by the following formula $Y=X^{2.2}$. The problematic area is marked by a rectangular. It is the lower input video level area. This area is separately depicted in the right part of FIG. 10. There it is seen, that all the input video levels up to the number 11 will be mapped to the output video level 0. The input video levels in the range from 12 to 19 will be mapped to the video output level 1 and so on. So, there are a lot of lower video levels which are destroyed.

In the case of implementing an incremental sub-field coding, there is an opportunity to avoid such an effect. In fact, it is possible to implement the gamma function via the sub-field weights. E.g. if it is assumed that we dispose of 12 sub-fields following a gamma function (with exponent 2.2) from 0 to 255 with a division step of 16 (4 Bit dithering) in that case for each of the 13 possible video values $V_n$ the value displayed should respect the following progression:

$$V_0 = 255 \times \left(\frac{0 \times 16}{192}\right)^{2.2} = 0$$

$$V_1 = 255 \times \left(\frac{1 \times 16}{192}\right)^{2.2} = 1$$

-continued $$V_2 = 255 \times \left(\frac{2 \times 16}{192}\right)^{2.2} = 5$$

$$V_3 = 255 \times \left(\frac{3 \times 16}{192}\right)^{2.2} = 12$$

$$V_4 = 255 \times \left(\frac{4 \times 16}{192}\right)^{2.2} = 23$$

$$V_5 = 255 \times \left(\frac{5 \times 16}{192}\right)^{2.2} = 37$$

$$V_6 = 255 \times \left(\frac{6 \times 16}{192}\right)^{2.2} = 55$$

$$V_7 = 255 \times \left(\frac{7 \times 16}{192}\right)^{2.2} = 78$$

$$V_8 = 255 \times \left(\frac{8 \times 16}{192}\right)^{2.2} = 104$$

$$V_9 = 255 \times \left(\frac{9 \times 16}{192}\right)^{2.2} = 135$$

$$V_{10} = 255 \times \left(\frac{10 \times 16}{192}\right)^{2.2} = 171$$

From these figures, the sub-field weights for an incremental code can be relatively simply derived. It has already been mentioned that each sub-field code word differs from the previous sub-field code word by the amount of the sub-field weight, which is additionally switched on in the step. This means we have to respect the following formulas:

$$V_{n+1}=V_n+SF_{n+1} \text{ for } n>0.$$

By simple mathematical operations it follows that the sub-field weights can be calculated according to the following formula.

$$SF_n=V_n-V_{n-1}.$$

This formula applied to the figures listed above, leads to the following sub-field weights:
$SF_1$=1−0=1
$SF_2$=5−1=4
$SF_3$=12−5=7
$SF_4$=23−12=11
$SF_5$=37−23=14
$SF_6$=55−37=18
$SF_7$=78−55=23
$SF_8$=104−78=26
$SF_9$=135−104=31
$SF_{10}$=171−135=36
$SF_{11}$=211−171=40
$SF_{12}$=255−211=44

Figure 11:
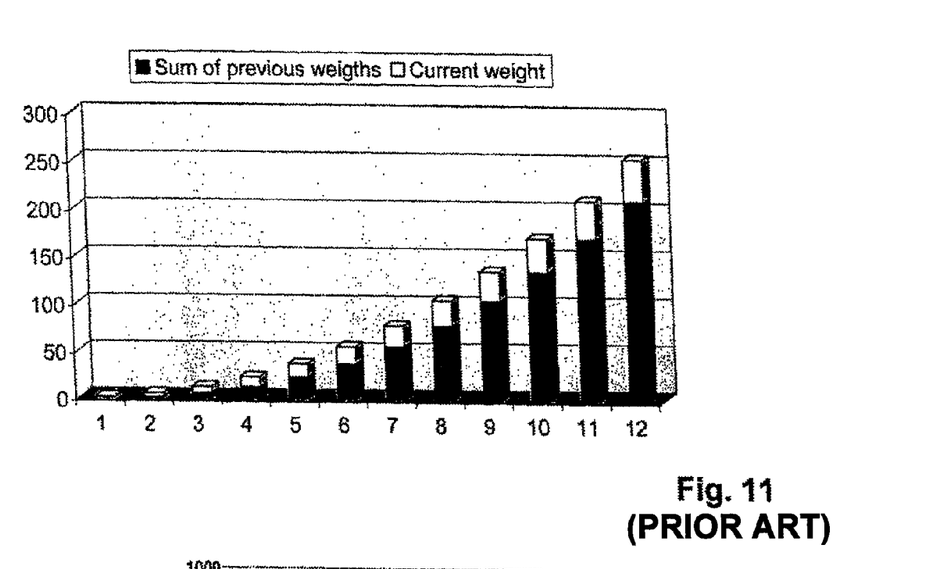
FIG. 11 shows the rebuilding of a gamma-like display characteristic when using an incremental sub-field coding.

The accumulation of these sub-field weights follows exactly the gamma function behavior from 1 (no sub-field on) up to 255 (all sub-fields on). In FIG. 11 the corresponding curve is shown in form of a bar graph for all 12 sub-fields.

Figure 12:
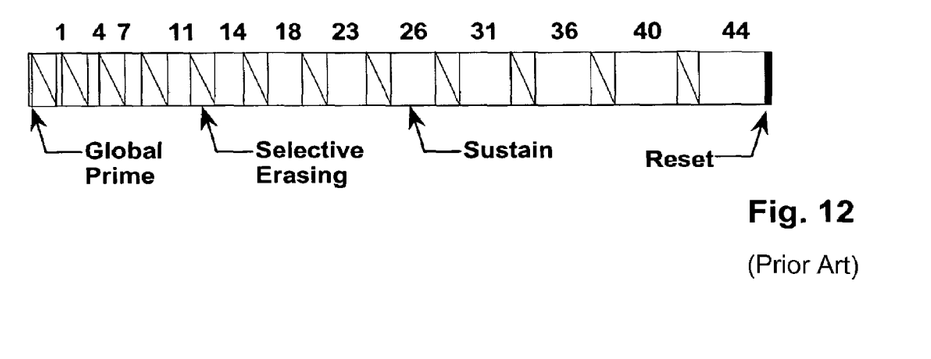
FIG. 12 shows a sub-field organization for an implementation of the incremental coding with a global addressing period, selectively erasing periods, sustaining periods and a global resetting period.

Since in the incremental coding method all sub-fields are sequentially activated (no sub-field "off" between two consecutive sub-fields "on" and vice versa) it is possible to avoid some operation in the electronic implementation of such a mode. There are two different possibilities, which will be presented below. The first mode is based on selective erasing operations. At the beginning of a frame period a global addressing operation will excite all the plasma cells. This means that all plasma cells are charged. Then in the next step the selected erasing operation will be performed. This aims at selecting each cell separately in order to be able to apply or not an erasing pulse. This operation is similar to a standard addressing or writing operation but aims at erasing specifically selected plasma cells. Then during the next sustaining operation only the cells, which have not been erased before, will generate light pulses. In that case it is not necessary to perform 3 operations per sub-field as in the standard ADS addressing scheme (namely selective writing or addressing operation plus global sustaining operation plus global erasing operation). Instead, there are only 2 operations required (selective erasing operation and global sustaining operation). Only at the end of the frame period a global reset operation (erasing operation) needs to be performed in order to initialize the whole panel for the next video frame. In such a mode the sub-fields are displayed in an order as shown in FIG. 12 where the sub-field weight increases step by step. The following table shows the code words for this kind of implementation.

field periods. Obviously, as in the second mode the lower sub-field rates are positioned at the end of the frame period. These modes require very efficient priming/erase operation since for the writing of the lower sub-field weights there is a long distance in time from the previous global priming operation, and in between there is no excitation of the plasma cell due to the specific coding.

In the introduction, it was already explained that the large area flickering is a real problem in countries, e.g. of Europe, using 50 Hz frame repetition rate in the TV norms, such as PAL and SECAM. However, even in the case of 60 Hz frame repetition rate such as in the NTSC TV system, such a flickering will become disturbing in the future with the increase of the display size (since the human eye is more sensitive to the

| Video level [0:12] | Priming | SF1 | SF2 | SF3 | SF4 | SF5 | SF6 | SF7 | SF8 | SF9 | SF10 | SF11 | SF12 | Reset |
|---|---|---|---|---|---|---|---|---|---|---|---|---|---|---|
| 0 | Global | 0 | 0 | 0 | 0 | 0 | 0 | 0 | 0 | 0 | 0 | 0 | 0 | Global |
| 1 | Global | 1 | 0 | 0 | 0 | 0 | 0 | 0 | 0 | 0 | 0 | 0 | 0 | Global |
| 2 | Global | 1 | 1 | 0 | 0 | 0 | 0 | 0 | 0 | 0 | 0 | 0 | 0 | Global |
| 3 | Global | 1 | 1 | 1 | 0 | 0 | 0 | 0 | 0 | 0 | 0 | 0 | 0 | Global |
| 4 | Global | 1 | 1 | 1 | 1 | 0 | 0 | 0 | 0 | 0 | 0 | 0 | 0 | Global |
| 5 | Global | 1 | 1 | 1 | 1 | 1 | 0 | 0 | 0 | 0 | 0 | 0 | 0 | Global |
| 6 | Global | 1 | 1 | 1 | 1 | 1 | 1 | 0 | 0 | 0 | 0 | 0 | 0 | Global |
| 7 | Global | 1 | 1 | 1 | 1 | 1 | 1 | 1 | 0 | 0 | 0 | 0 | 0 | Global |
| 8 | Global | 1 | 1 | 1 | 1 | 1 | 1 | 1 | 1 | 0 | 0 | 0 | 0 | Global |
| 9 | Global | 1 | 1 | 1 | 1 | 1 | 1 | 1 | 1 | 1 | 0 | 0 | 0 | Global |
| 10 | Global | 1 | 1 | 1 | 1 | 1 | 1 | 1 | 1 | 1 | 1 | 0 | 0 | Global |
| 11 | Global | 1 | 1 | 1 | 1 | 1 | 1 | 1 | 1 | 1 | 1 | 1 | 0 | Global |
| 12 | Global | 1 | 1 | 1 | 1 | 1 | 1 | 1 | 1 | 1 | 1 | 1 | 1 | Global |

Figure 13:
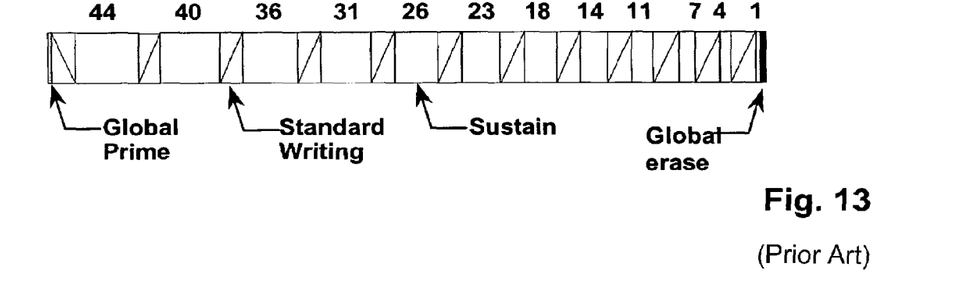
FIG. 13 shows a sub-field organization for an implementation of an incremental sub-field coding with a global priming period, selective addressing periods, sustaining periods and a global erase period.
Figure 14:
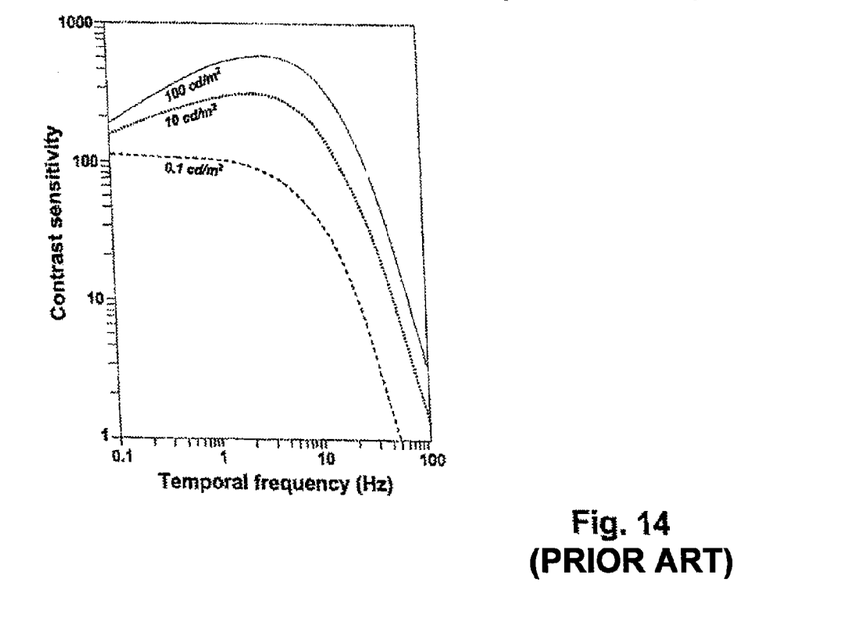
FIG. 14 shows the human eye temporal response characteristic.

The second possible implementation is based on a selective writing of plasma cells. At the beginning of a frame period a global priming and erase operation is performed. This is a standard priming/erase operation, which is also often used in the ADS addressing scheme. The sub-fields are placed in a reverse order and selectively activated via a standard writing/addressing operation. There is no need for an erase operation in the sub-field period anymore. Only at the end of the frame period a global erasing operation needs to be performed as a reset before the next frame starts. This mode is illustrated in FIG. 13. This mode is not the optimized one for an implementation of an incremental coding but it is the only one, which can be used on a panel which does not dispose of the selective erasing capability, i.e. where no separate erasing lines are provided. In the following table the code words used in the second mode are listed.

large area flickering in the peripheral zones) as well as with the increase of the luminance or brightness of the picture. Note that the peak white luminance level is increased more and more on PDPs. In FIG. 14 the human eye sensitivity versus temporal frequency components for different luminance levels is depicted. Even for 75 Hz temporal frequency components, there are contrast sensitivity values in the range of 2 to 3 for the two high luminance levels. For that reason, the concept of flickering reduction by an artificial frequency doubling is not only an advantage for 50 Hz video norms but also for 60 Hz video norms and even for PC applications which tend to 75 Hz or more frame repetition rate.

The concept of artificial frequency doubling adapted to the PDP technology is already described in the publication document of another European patent application of the applicant

| Video level [0:12] | Priming | SF12 | SF11 | SF10 | SF9 | SF8 | SF7 | SF6 | SF5 | SF4 | SF3 | SF2 | SF1 | Reset |
|---|---|---|---|---|---|---|---|---|---|---|---|---|---|---|
| 0 | Global | 0 | 0 | 0 | 0 | 0 | 0 | 0 | 0 | 0 | 0 | 0 | 0 | Global |
| 1 | Global | 0 | 0 | 0 | 0 | 0 | 0 | 0 | 0 | 0 | 0 | 0 | 1 | Global |
| 2 | Global | 0 | 0 | 0 | 0 | 0 | 0 | 0 | 0 | 0 | 0 | 1 | 1 | Global |
| 3 | Global | 0 | 0 | 0 | 0 | 0 | 0 | 0 | 0 | 0 | 1 | 1 | 1 | Global |
| 4 | Global | 0 | 0 | 0 | 0 | 0 | 0 | 0 | 0 | 1 | 1 | 1 | 1 | Global |
| 5 | Global | 0 | 0 | 0 | 0 | 0 | 0 | 0 | 1 | 1 | 1 | 1 | 1 | Global |
| 6 | Global | 0 | 0 | 0 | 0 | 0 | 0 | 1 | 1 | 1 | 1 | 1 | 1 | Global |
| 7 | Global | 0 | 0 | 0 | 0 | 0 | 1 | 1 | 1 | 1 | 1 | 1 | 1 | Global |
| 8 | Global | 0 | 0 | 0 | 0 | 1 | 1 | 1 | 1 | 1 | 1 | 1 | 1 | Global |
| 9 | Global | 0 | 0 | 0 | 1 | 1 | 1 | 1 | 1 | 1 | 1 | 1 | 1 | Global |
| 10 | Global | 0 | 0 | 1 | 1 | 1 | 1 | 1 | 1 | 1 | 1 | 1 | 1 | Global |
| 11 | Global | 0 | 1 | 1 | 1 | 1 | 1 | 1 | 1 | 1 | 1 | 1 | 1 | Global |
| 12 | Global | 1 | 1 | 1 | 1 | 1 | 1 | 1 | 1 | 1 | 1 | 1 | 1 | Global |

Figure 15:
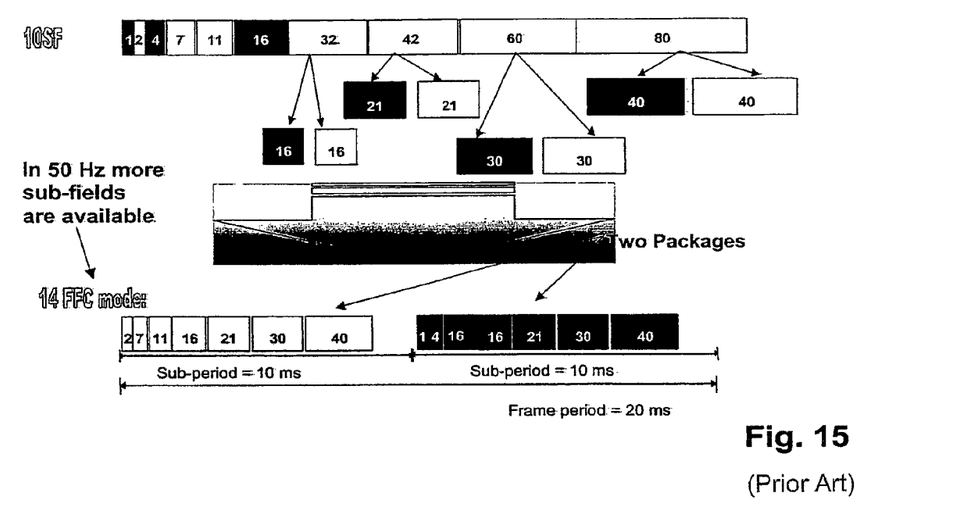
FIG. 15 shows a known principle of controlling a display device when using a standard flicker free code.

In both modes the saving of one operation per sub-field period, saves a lot of time and enables the use of more subwith the number EP-A-0 982 708. This concept is based on the main idea of sorting the sub-fields in two groups inside the frame period (20 ms in case of 50 Hz video norms). Each group is displayed in an equivalent time frame, i.e. 10 ms in case of 50 Hz video norms respecting the fact that the most significant sub-fields of each group will have preferably the same weights. Such a code can relatively simply be derived from a standard code as can be seen in FIG. 15. There, at the top of FIG. 15 an example of a 10 sub-field code is shown. The four most significant sub-fields are split in two parts by a bisection operation. Then the resulting 14 sub-field periods are organized in two consecutive groups in an optimized fashion, so that in each group almost the same amount of light pulses will be produced, i.e. most similar numbers result, when summing up the sub-field weights of the sub-fields in either group. The grouping of the sub-fields is depicted in FIG. 15. It is one possible generation of a flicker-free code with 14 sub-fields from a standard 10 sub-field code. In other words, the obtained flicker-free code needs 14 sub-fields but will only have the quality of a standard 10 sub-field code.

In the case of an incremental sub-field coding, this is not really acceptable since it cannot be afforded to have the quality of a sub-field organization with a lower sub-field number since we need as many sub-fields as possible to dispose of an acceptable gray level rendition. If not enough sub-fields are used in case of the incremental encoding, the dithering pattern is very visible and this will lead to a strong noise level in the picture. It is true what is explained in the document EP-A-0 982 708 that it is possible to use more sub-fields in the flicker-free code mode at 50 Hz video norms than in a standard mode for 60 Hz video norms since more time is available (20 ms instead of 16.6 ms). Nevertheless, in case of incremental encoding, the dithering will be more visible at the 50 Hz frame repetition rate than at the 60 Hz frame repetition rate because the dithering pattern changes less often. It is notified that the dithering pattern changes for each pixel/color, each line and each frame. For that reason, it is not really feasible to split the most significant sub-fields from a standard sub-field code for 60 Hz frame repetition rate to design a specific flicker-free code for 50 Hz frame repetition rate. In addition, it has already been mentioned that even for 60 Hz frame repetition rate the large area flickering is an issue and, therefore, also requires a specific flicker-free code mode.

Figure 16:
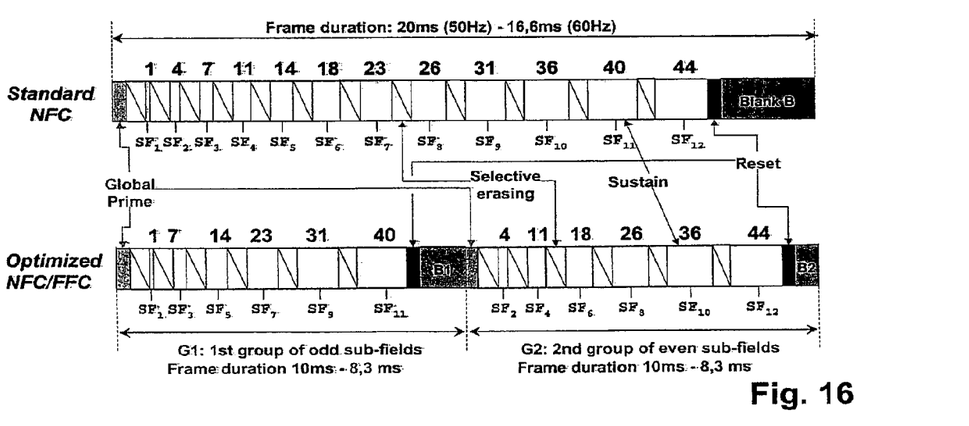
FIG. 16 shows a first embodiment for controlling a display device according to the invention when using an incremental code.

Therefore, an adaptation of the sub-field grouping is required for the incremental sub-field encoding mode. According to the invention this adaptation can be made simply by alternating the position of the sub-fields coming from a standard incremental code in order to generate two groups of sub-fields with relatively similar size, each group being included in a 10 ms time frame. In the case of 60 Hz video norms or PC graphic applications running with 60 Hz frame repetition, the two groups will be included in two 8.3 ms time frames. For 75 Hz video applications, the time frame would be 6.6 ms. For the specific case of a selective erasing operation in front of each sustaining period, the solution according to the invention is illustrated in FIG. 16. At the top of FIG. 16 the sub-field organization for the standard incremental code with 12 sub-fields is shown. At the beginning of the frame period there is a global addressing period (priming without erasing), in which all plasma cells are charged and prepared for light emission. Then the different sub-field periods follow. In each case there is selective erasing operation in front of the sustaining operation, as described already in connection with FIG. 12. The sub-field weights increase step-by-step with the number of sub-fields. After the sustaining operation of the sub-field $SF_{12}$, the global reset operation is performed. Behind this a blanking period follows, which needs to be present especially for the case where the frame period is subject of jittering, for example in the case non-standard video signals are displayed on the PDP.

The optimized flicker-free code is depicted at the bottom of FIG. 16. The frame period is divided in two periods of equal size, i.e. in a 10 ms raster. In each group G1 and G2 there is an amount of 6 sub-fields grouped together. In the first group G1 all the odd sub-fields $SF_1$ to $SF_{11}$ are grouped together. In the second group all the even sub-fields $SF_2$ to $SF_{12}$ are grouped together. Behind the sub-field $SF_{11}$ of the first group and $SF_{12}$ of the second group the global reset operation is performed. At the beginning of each sub-field group the global addressing operation is performed for preparation of the cells. Behind the global reset operation of the first group G1 the first part of the blanking period B1 follows up to the end of the first sub-field group. Likewise, behind the global reset operation in the second group G2 a second part of the blanking operation B2 follows. It can be seen from FIG. 16, that the blanking period of the standard sub-field encoding mode needs to be distributed and adjusted. Of course, the total amount of blanking periods is smaller than in the standard incremental coding mode because one global addressing period and one global resetting period is added in the case of the flicker-free coding. When counting together the sub-field weights in both groups, it is evident that there is a relatively great difference between both values. The sum of sub-field weights for the first group G1 is 116, whereas the sum of the sub-field weights for the second group is 130. While this would not be an optimum for a standard sub-field encoding, this has proved to be no problem in case of the incremental sub-field coding. Simulations and measurements have proved, that this type of sub-field grouping brings better results than a sub-field grouping where the sub-field weights in both groups are better equalized. A prerequisite for this observation is, however, that the incremental encoding is used. This observation can be satisfyingly explained when taking into account the dithering step. This is explained hereinafter by an example.

If, for example, a sub-field code needs to be displayed where the first 8 sub-fields $SF_1$ to $SF_8$ are activated, this means, that in the flicker-free code the first 4 sub-fields in group G1 will produce light and the first 4 sub-fields in group G2 will produce light. The resulting sum of sub-field weights is 45 for the first group G1 and 59 for the second group G2. When due to a dithering step the next higher sub-field $SF_9$ is activated, the situation changes to a sum of 76 for the first group G1 and 59 for the second group G2. So in the first case the second group G2 had the higher sub-field weights sum and in the second case the first group G1 has the higher sub-field weights sum. This means that over a number of frame periods an equalization is performed and, therefore, the human eye will not have the impression of a remaining strong 50 Hz frequency component. The situation is different when for better equalization in group G1 the sub-fields $SF_2$, $SF_3$, $SF_6$, $SF_7$, $SF_{10}$, and $SF_{11}$ are grouped together and in sub-field group G2 the sub-fields $SF_1$, $SF_4$, $SF_5$, $SF_8$, $SF_9$, and $SF_{12}$. In this case for the same code word the sum of sub-field weights is for group G1 52 and for group G2 also the same value 52 when no dithering step is present. Then, however, when a dithering step is switched on with activation of sub-field weight $SF_9$, the sum of sub-field weights for the second group will change to the value 83. Therefore, there cannot be equalization over a number of frame-periods of this discrepancy. A corresponding 50 Hz frequency component would be visible.

Of course, the example shown in FIG. 16 is not the only possibility to generate a flicker-free incremental code. For example, the even sub-fields could be grouped together in the first group G1 and the odd sub-fields respectively in the second group G2. The major need is to generate two groups with the same duration and this is done using a part of the standard blanking period B (normally located between two video frames) to be put between the two groups as well as between the last group and the next frame. Since the weights of the sub-fields are not exactly the same, the length of these two blanking periods B1 and B2 can be different as also depicted in FIG. 16. The advantage of this flicker-free incremental sub-field encoding mode is the fact that the same number of sub-fields are required as for a standard flicker-free sub-field encoding mode and that the same picture quality in terms of gray scale rendition is produced.

The same encoding principle as in the case of a standard incremental sub-field encoding will be used and this leads to the following encoding table in case of our 12 sub-field example.

As already mentioned in the first group there could be grouped together either the odd or the even sub-fields. And respectively in the second group either the even or the odd sub-fields can be grouped together. This can be utilized for a further improvement. Namely, the position of the sub-field groups having grouped together all the even or odd sub-fields, can be exchanged from frame period to frame period in a predetermined way. This could help to further reduce a

| Video level [0:12] | Priming | SF1 | SF3 | SF5 | SF7 | SF9 | SF11 | Reset | Priming | SF2 | SF4 | SF6 | SF8 | SF10 | SF12 | Reset |
|---|---|---|---|---|---|---|---|---|---|---|---|---|---|---|---|---|
| 0 | Global | 0 | 0 | 0 | 0 | 0 | 0 | Global | Global | 0 | 0 | 0 | 0 | 0 | 0 | Global |
| 1 | Global | 1 | 0 | 0 | 0 | 0 | 0 | Global | Global | 0 | 0 | 0 | 0 | 0 | 0 | Global |
| 2 | Global | 1 | 0 | 0 | 0 | 0 | 0 | Global | Global | 1 | 0 | 0 | 0 | 0 | 0 | Global |
| 3 | Global | 1 | 1 | 0 | 0 | 0 | 0 | Global | Global | 1 | 0 | 0 | 0 | 0 | 0 | Global |
| 4 | Global | 1 | 1 | 0 | 0 | 0 | 0 | Global | Global | 1 | 1 | 0 | 0 | 0 | 0 | Global |
| 5 | Global | 1 | 1 | 1 | 0 | 0 | 0 | Global | Global | 1 | 1 | 0 | 0 | 0 | 0 | Global |
| 6 | Global | 1 | 1 | 1 | 0 | 0 | 0 | Global | Global | 1 | 1 | 1 | 0 | 0 | 0 | Global |
| 7 | Global | 1 | 1 | 1 | 1 | 0 | 0 | Global | Global | 1 | 1 | 1 | 0 | 0 | 0 | Global |
| 8 | Global | 1 | 1 | 1 | 1 | 0 | 0 | Global | Global | 1 | 1 | 1 | 1 | 0 | 0 | Global |
| 9 | Global | 1 | 1 | 1 | 1 | 1 | 0 | Global | Global | 1 | 1 | 1 | 1 | 0 | 0 | Global |
| 10 | Global | 1 | 1 | 1 | 1 | 1 | 0 | Global | Global | 1 | 1 | 1 | 1 | 1 | 0 | Global |
| 11 | Global | 1 | 1 | 1 | 1 | 1 | 1 | Global | Global | 1 | 1 | 1 | 1 | 1 | 0 | Global |
| 12 | Global | 1 | 1 | 1 | 1 | 1 | 1 | Global | Global | 1 | 1 | 1 | 1 | 1 | 1 | Global |

Figure 17:
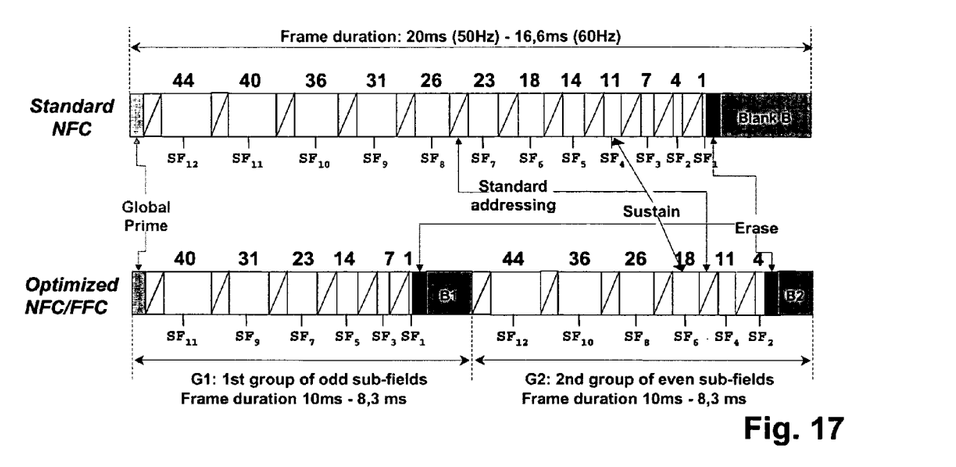
FIG. 17 shows a second embodiment for controlling a display device according to the invention when using an incremental sub-field encoding.

In the following the concept of generating a flicker-free code for the case of an implementation of an incremental coding with selective writing operation in the sub-field periods, is explained. The overall principle stays the same but the order of the sub-field is inverted as can be seen in FIG. 17. Also in this case, in the first group G1 all the odd sub-fields $SF_{11}$ to $SF_1$ are grouped together. In the second group G2 all the even sub-fields $SF_{12}$ to $SF_2$ are grouped together. After the sustaining period of the last sub-field $SF_1$ in the first group G1 a global erase operation follows. Also the global erase operation is performed after the sustaining period of the last sub-field $SF_2$ in the second group G2. The blanking period is again sub-divided in two parts B1 and B2 in order to adjust the sub-field group lengths and to assure that the 10 ms or 8.3 ms raster can be maintained. It is also remarked, that the first group of sub-fields can be made with either the odd or even sub-fields from the prior incremental code. In the example shown in FIG. 17 there is no global priming operation in the second sub-field group G2. Of course, this depends on the efficiency of the priming operation itself. In case efficiency is not high enough, it is recommended to implement also a global priming operation at the beginning of the second sub-field group G2.

remaining low frequency component. An alternative to this solution is to change the group position in a randomized fashion instead of the deterministic alternation. Also this can further reduce the large area flickering. Both solutions are simple to implement. The sub-field coding process can remain unchanged. However, it is required that the sub-field code word entries stored in the frame memory are read out in a different order for display driving. Corresponding masking Bit patterns can be used for this purpose when addressing the sub-field code words in a frame memory.

Figure 18:
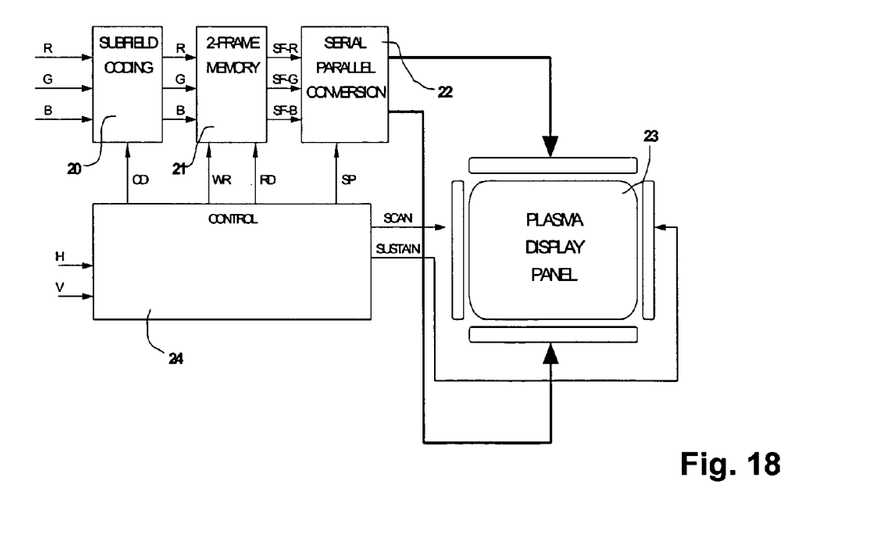
FIG. 18 shows a block diagram of an apparatus according to the invention.

FIG. 18 shows a block diagram of the corresponding apparatus for controlling the display. Input R, G, B video data is forwarded to a sub-field coding unit 20. For the sub-field coding process to each RGB data the corresponding code word will be selected from the corresponding look-up table. The sub-field code words are forwarded to a memory 21 separately for the different color components R, G, B. This memory preferably has a capacity of two frame memories. This is recommendable due to the plasma driving process. The plasma display panel is driven in sub-fields as explained above and, therefore, for every pixel only one Bit (in fact 3 Bits because of the 3 color components) needs to be read out of this memory per sub-field. On the other hand data needs to

| Video level [0:12] | Priming | SF11 | SF9 | SF7 | SF5 | SF3 | SF1 | Reset | SF12 | SF10 | SF8 | SF6 | SF4 | SF2 | Reset |
|---|---|---|---|---|---|---|---|---|---|---|---|---|---|---|---|
| 0 | Global | 0 | 0 | 0 | 0 | 0 | 0 | Global | 0 | 0 | 0 | 0 | 0 | 0 | Global |
| 1 | Global | 0 | 0 | 0 | 0 | 0 | 1 | Global | 0 | 0 | 0 | 0 | 0 | 0 | Global |
| 2 | Global | 0 | 0 | 0 | 0 | 0 | 1 | Global | 0 | 0 | 0 | 0 | 0 | 1 | Global |
| 3 | Global | 0 | 0 | 0 | 0 | 1 | 1 | Global | 0 | 0 | 0 | 0 | 0 | 1 | Global |
| 4 | Global | 0 | 0 | 0 | 0 | 1 | 1 | Global | 0 | 0 | 0 | 0 | 1 | 1 | Global |
| 5 | Global | 0 | 0 | 0 | 1 | 1 | 1 | Global | 0 | 0 | 0 | 0 | 1 | 1 | Global |
| 6 | Global | 0 | 0 | 0 | 1 | 1 | 1 | Global | 0 | 0 | 0 | 1 | 1 | 1 | Global |
| 7 | Global | 0 | 0 | 1 | 1 | 1 | 1 | Global | 0 | 0 | 0 | 1 | 1 | 1 | Global |
| 8 | Global | 0 | 0 | 1 | 1 | 1 | 1 | Global | 0 | 0 | 1 | 1 | 1 | 1 | Global |
| 9 | Global | 0 | 1 | 1 | 1 | 1 | 1 | Global | 0 | 0 | 1 | 1 | 1 | 1 | Global |
| 10 | Global | 0 | 1 | 1 | 1 | 1 | 1 | Global | 0 | 1 | 1 | 1 | 1 | 1 | Global |
| 11 | Global | 1 | 1 | 1 | 1 | 1 | 1 | Global | 0 | 1 | 1 | 1 | 1 | 1 | Global |
| 12 | Global | 1 | 1 | 1 | 1 | 1 | 1 | Global | 1 | 1 | 1 | 1 | 1 | 1 | Global | be written in the memory. To avoid any conflicts between writing and reading, there are two independent frame memories used. When data is read from one frame memory, the other frame memory is used for writing of data and vice versa. The read Bits of the sub-field code words are collected in a serial parallel conversion unit 22 for a whole line of the PDP. As there are e.g. 854 pixel in one line, this means 2962 sub-field coding Bits need to be read for each line per sub-field period. These bits are input in the shift registers of the serial/parallel conversion unit 22.

The sub-field code words are stored in memory unit 21. The external control unit 24 also controls reading and writing from and to the memory unit. Also it controls the sub-field coding process and the serial/parallel conversion. Further it generates all scan, priming, sustaining and erasing pulses for PDP control. It receives horizontal H and vertical V synchronizing signals for reference timing.

Some or all of the electronic components shown in the different blocks may be integrated together with the PDP matrix display. They could also be in a separate box, which is to be connected with the plasma display panel.

The invention can be used in particular in PDPs. Plasma displays are currently used in consumer electronics e.g. for TV sets, and also as a monitor for computers. However, use of the invention is also appropriate for matrix displays, where the light output is also controlled with small pulses in sub-periods, i.e. where the PWM principle is used for controlling the light output.

The invention claimed is:

1. Method for controlling a display device having a plurality of elements corresponding to the color components of pixels of a video picture, said method comprising the steps of:
processing video picture data, said video picture data comprising video level pixel data for each color component;
converting said pixel data into a sub-field code word in which to each bit of the sub-field code word a certain duration is assigned during which the corresponding element of the pixel is activated for light output, hereinafter called sub-field,
wherein for a sub-field coding process, a specific code is utilized in which by corresponding bit entries it is avoided that in a time period which corresponds to the frame duration, hereinafter called frame period, a sub-field is inactivated between two activated sub-fields and in which it is avoided that in a frame period a sub-field is activated between two inactivated sub-fields, thereby defining an incremental code ordering for the sub-fields in said frame period, and
wherein the duration of each subfield in the frame period is different from the durations of all other sub-fields in the frame period,
organizing the sub-fields of the frame period in two consecutive groups, wherein the odd numbered sub-fields, according to the incremental code ordering are grouped in one group and the even numbered sub-fields according to the incremental code ordering are grouped in another group, thereby defining a final ordering of the sub-fields in said frame period.

2. Method according to claim 1, wherein the two sub-field groups are separated from each other by a dedicated blanking period so that the light output occurs in a specific time raster.

3. The method according to claim 2, wherein the two subfield groups are separated from each other by a dedicated blanking period so that the light output occurs in a 10 ms raster for 50 Hz frame repetition rate or in a 8.3 ms raster for 60 Hz frame repetition rate.

4. Method according to claim 1, wherein at the beginning of each sub-field group a global addressing operation is performed in a sub-period, in which the video level pixel data for each color component is activated for a light output.

5. Method according to claim 4, wherein to each sub-field period a selective erasing period and a global sustaining period belongs, wherein in the selective erasing period the video level pixel data for each color component which shall no longer produce a light output in the current sub-field group is inactivated and in the global sustaining period the activated video level pixel data for each color component stimulated for light output in pulses.

6. Method according to claim 1, wherein at the beginning of each sub-field group a global priming operation is performed in a sub-period, in which the display elements are pre-charged for light output.

7. Method according to claim 6, wherein to each sub-field a selective addressing period and a global sustaining period belongs, wherein in the selective addressing period those display elements which shall produce light in the corresponding video level pixel data for each color component are activated and in the global sustaining period the activated video level pixel data for each color component is stimulated for light output in small pulses.

8. Method according to claim 1, wherein at the end of each sub-field group a global erasing period follows, in which the video level pixel data for each color component is reset to a neutral state.

9. Method according to claim 1, wherein a specific code used to convert the pixel data into a sub-field code word has the characteristic that a sub-field weight, indicative of the amount of light pulses generated during the sub-field period for each sub-field, increases from sub-field to sub-field or decreases from sub-field to sub-field in the frame period when all the sub-field weights are ordered according to size.

10. Method according to claim 9, wherein the sub-field weights used for the specific code when ordered according to size follow the form of a gamma function, $Y=X^\gamma$ with $\gamma=2.2$, where Y is an output video level and X is an input video level.

11. Method according to claim 1, wherein the position of the sub-field groups within the frame period is exchanged in a predetermined frame period raster.

12. The method according to claim 11, wherein the position of the sub-field groups within the frame period is exchanged from frame period to frame period in a predetermined frame period raster.

13. The method according to claim 11, wherein the position of the sub-field groups within the frame period is exchanged in a randomized fashion.

14. Apparatus for controlling said display device having a plurality of elements corresponding to the color components of pixels of a video picture, said apparatus comprising:
a video processing unit in which video picture data is processed, said video picture data comprising video level pixel data for each color component;
a sub-field coding unit in which the video pixel data for each color component is converted into a sub-field code word in which each bit of the sub-field code word determines a certain duration during which the corresponding element of a video pixel is activated for light output, herein after called a sub-field, wherein for a sub-field coding process the sub-field coding unit applies a specific code, in which by corresponding bit entries it is avoided that in a time period which corresponds to the frame duration, hereinafter called a frame period, a sub-field is inactivated between two activated sub-fields and in which it is avoided that in a frame period a sub-field is activated between two inactivated sub-fields, thereby defining an incremental code ordering for the sub-fields in said frame period, and wherein the duration of each subfield in the frame period is different from the durations of all other sub-fields in the frame period;

a controller for display driver circuits, which controls the activation for light generation in such a manner that the light is generated in a frame period in two consecutive sub-field groups, wherein the odd number sub-fields according to the incremental code ordering are grouped in one group and the even number sub-fields, according to the incremental code ordering are grouped in another group, thereby defining a final ordering of the sub-fields in said frame period.

* * * * *